United States Patent [19]
Tekathen et al.

[11] Patent Number: 5,495,934
[45] Date of Patent: Mar. 5, 1996

[54] REVERSIBLE CONVEYOR BELT WITH DOUBLE HELICAL CHAIN

[75] Inventors: Johann Tekathen, Dinslaken; Reinold Krohm, Herne, both of Germany

[73] Assignee: HT Maschinenvertrieb GmbH, Bottrop, Germany

[21] Appl. No.: 300,140

[22] Filed: Sep. 2, 1994

[30]    Foreign Application Priority Data

Sep. 28, 1993 [DE]  Germany ..................... 43 32 656.0
Jun. 29, 1994 [DE]  Germany ..................... 44 22 736.1

[51] Int. Cl.⁶ ................................................. B65G 19/24
[52] U.S. Cl. ............................................ 198/731; 198/734
[58] Field of Search .................................. 198/729, 731, 198/733, 734

[56]            References Cited

U.S. PATENT DOCUMENTS 3,410,085  11/1968  Sheth .
4,312,443  1/1982   Niemoller et al. .
5,435,434  7/1995   Tekathen et al. ...................... 198/731

FOREIGN PATENT DOCUMENTS 270702    6/1988  European Pat. Off. ............... 198/731
833322    1/1952  Germany ............................ 198/731
2735792   6/1979  Germany .
3322697   1/1985  Germany .
3525984   1/1987  Germany ............................ 198/731
3704176   5/1990  Germany .
3905754   8/1990  Germany .
3929148   1/1991  Germany .
4124788   1/1993  Germany .

*Primary Examiner*—Joseph E. Valenza
*Attorney, Agent, or Firm*—James Creighton Wray

[57]            ABSTRACT

For use in underground mining, in particular coal mining, a chain belt is provided, which consists of the standard vertical links and horizontal links which preferably have double helical surfaces. These horizontal links with the double helical surfaces are connected to a symmetrically constructed pusher, whereby either the base and the guide shoes, or only the base are shaped symmetrically. The symmetry plane is exactly in the center, when viewed in conveying direction, so that such a pusher can be reversed either in relation to the base or in its entirety, or together with the entire chain belt. This results in much higher lifespans.

12 Claims, 3 Drawing Sheets

REVERSIBLE CONVEYOR BELT WITH DOUBLE HELICAL CHAIN

BACKGROUND OF THE INVENTION

The invention relates to a chain belt for chain conveyors used in underground mining and tunnel construction, having vertical and horizontal links and pushers spaced apart and encompassing the horizontal links, said pushers being equipped at the end with guide shoes adapted to the guide profile of the troughs.

Such chain belts with interlocking chain links are used in underground mining and tunnel construction, particularly for transporting the mined coal and rock. Such chain conveyors are also used above ground for various purposes. The chain belts are hereby pulled through conveyor troughs with a sigma profile on their sides in such a way that the pushers of the chain belts are guided therein. They are thus subject to correspondingly high wear. During the last years, the trend in the development of such chain belts consisted of choosing increasingly larger dimensions in order to fulfill ever increasing demands on performance. However, wear cannot be prevented. Instead, wear becomes increasingly greater, since the number and area of the contact points between chain and chain starwheel is becoming increasingly smaller. The obtainable lifespans are even unsatisfactory for chains with a wire diameter of 42 mm and more.

There are several known solutions for improving the power transmission between chain and chain starwheel (German Offenlegungsschrift 39 29 148, German Auslegungsschrift 27 35 792, and German Patent 37 04 176, as well as German Offenlegungsschrift 39 05 754). German Offenlegungsschrift 41 24 788 introduces a chain belt in which the horizontal links have horizontally and vertically extending double helical surfaces enabling a safe and large contact in the area of the chain starwheel. This special design results in a much improved power transmission in the starwheel area, and thus makes it possible to transmit higher drive forces with the same chain belt. The disadvantage here is, however, that the continued use of troughs with sigma-shaped guide profiles still prohibits a reversing of these chain belts, in particular of the pushers. Once a certain wear has occurred, this makes it necessary that the chain belts must be replaced, although the other side of the pushers, i.e., the side not dragging along the trough, usually would permit further use.

The invention is thus based on the task of creating a chain belt that is easily reversed, both in its entirety and in regard to its components, particularly its pushers.

SUMMARY OF THE INVENTION

According to the invention, this task is solved in that the guide shoes are connected releasably to the base of the pusher; that the guide shoes are symmetrical when viewed transversely to the conveying direction; and that the base is divided lengthwise in the center and has identically constructed top and bottom parts.

A chain belt constructed in this manner can be reversed easily, even in the case of the troughs still commonly equipped with sigma-shaped guide profiles. This is made possible by the fact that the pushers are connected to the guide shoes in a releasable manner. If, as furthermore provided, the guide shoes are constructed symmetrically in transverse direction to the conveying direction, this makes it possible for the first time to also use such pushers in symmetrical trough profiles—which would facilitate and improve overall operation, in particular because such symmetrically constructed guide shoes or pushers also permit a better guidance in the returning run. In the case of known chain belts and troughs, this may result in a height difference of 5 mm and more, which in the past often resulted in problems, in particular increased wear. The division of the base into top and bottom part lengthwise through the middle facilitates the connection with the respective horizontal chain link, since the latter is simply integrated and fixed between top and bottom part by inserting retaining screws. If not the entire chain belt is supposed to be reversed or can be reversed, it is possible to reverse individual pushers, and is in an advantageous manner easily accomplished because it requires only a simple replacement of the two parts, i.e., top and bottom part. Another advantage is that in the case of wear it is possible to replace only the worn part, making these chain belts much more economical.

According to a useful design of the invention, it is provided that the base is constructed so as to be positioned transversely to the conveying direction and so as to accept two adjoining horizontal chain links, whereby the chain links are arranged so as to be encompassed between top and bottom part. This design also permits an easy replacement, since the base consists of the two easily connected top and bottom parts, thus making it easy to realize a double-center chain belt in this manner.

Another useful design provides that the symmetric guide shoes consist of a rounded tip engaging with the guide profile of the troughs, a short glider, and a clamping piece that can be inserted between top and bottom part and having a retaining bore corresponding to the bores in the top and bottom part. Such guide shoes can be easily connected to the base by inserting the clamping piece into the base and fixing it with a retaining screw.

In order to enable accurate guidance and to simultaneously secure a safe attachment of the guide shoe at the base, the clamping piece should be constructed in double T-shape, whereby the center bar holds the retaining bore, and the side bars are constructed so as to mesh with correspondingly formed recesses in the sides of the base, and whereby the clamping piece and base have rounded edges at the contact surfaces. This optimally fixates the guide shoe, i.e., in all directions, so that only one retaining screw must be used. Such a form-fitting connection results in high lifespans, whereby the insertion is facilitated by the rounded edges.

Depending on the number of chains used, it is usually enough to use two or three retaining screws to connect top and bottom part, whereby a second retaining screw is added per guide shoe. To avoid a separate bearing attachment and enable the replacement of individual retaining screws, the invention provides that the retaining screws that connect the top and bottom part of the base and are positioned in blind holes are constructed identical to the retaining screws connecting the bases and guide shoes or clamping piece. Due to the placement of the screw heads in blind holes, long lifespans can be expected.

A turning of the retaining screws in the base is prevented in that the blind holes have on both sides projecting recesses that are constructed so as to accept retaining noses coordinated with one of the screw heads of the retaining screws. The inaccessible screw head of the bottom part thus can be easily fixated, whereby this is also true when the pusher or the entire chain belt is reversed. This ensures that even when the top part is now located at the bottom, a corresponding blind hole with recesses is available. Top and bottom part are thus identical, even in reference to these individual details.

In order to be able to easily remove the guide shoes from the base, the guide shoes are equipped with an articulated groove near the dividing joint towards the base. It is possible to insert a suitable tool into this articulated groove, so that both parts are easily separated, if necessary by light tapping with a hammer.

It has already been pointed out above that it is important to provide not only chain belts which can be reversed repeatedly, but also such which are able to transmit high drive forces. According to the invention this is achieved in that the horizontal links encompassed by the base have arches with horizontally and vertically acting double helical surfaces and are designed in a recessed manner, with straight sides that encompass the pusher. This additionally stabilizes the pusher position, so that the lifespans of the invented chain belts are further increased.

In order to enable accurate guidance and optimize the passage through the starwheel, it is provided that the double helical surfaces have sides forming a kinematically rising and rounded central tip of 120° to 140°. While it is useful that the vertical links correspond to the vertical chain link commonly used in the past, the horizontal links, as already mentioned, are shaped specially, although their dimensions are identical to those of the vertical links. It is naturally possible to also use special vertical chain links instead of the normal vertical chain links; but the use of normal chain links is usually more economical and provides sufficient tensile forces of the chain. The special side design corresponds to the design of the contact surfaces in the starwheel, so that the desired optimum power transmission is effectively accomplished in the starwheel also. The chain links cannot wear out each other, since the arrow-shaped tip is rounded in the front according to the chain link arch of the vertical link. The vertical and horizontal links additionally have the same pitch, resulting in lower stresses, in particular if the use of standard starwheels is retained.

The described horizontal links can be produced easily and practically if, as the invention proposes, the double helical surfaces are laterally swaged to the arches, or the horizontal links are swaged in their entirety. Swaged chain links of this type have the advantage that especially high forces are transmitted, so that the breaking points may be 30% higher for the same dimensions of standard chain links. This also ensures the exact same dimensions of all such chain links.

Improved running characteristics of the chain belt can be achieved if the vertical links have a flattened side that results in a larger contact surface. This is achieved in particular in that the vertical links have rectangular chain link sides in barrel shape, so that they contact the trough bottom with the larger surface.

Another characteristic of the invention which also improves the running characteristics is characterized in that the running surface of the pusher, preferably of the base, has a concave shape when viewed as a cross-section. Depending on the conveying direction, the running surfaces run on one of the edges or on both edges, resulting in a better conveying and cleaning effect.

The invention is particularly characterized in that it creates a chain belt with overall symmetrical pushers, which makes it possible for the first time to also use symmetrical trough profiles. This ensures a much better guidance of the pushers, less wear, and an optimized conveying behavior. A particular advantage is that in this manner the individual pushers or entire chain belt can be reversed so that the lifespans of such chain belts are at least doubled. It is hereby especially important that the pusher is overall symmetrical on both sides, i.e., identical, so that it is possible to replace a top or bottom part, if needed. It is naturally also possible to reverse a single pusher, if this is useful for whatever reason. This high performance chain belt also has a favorable transmission of drive forces from the chain starwheel to the chain belt itself.

Other details and advantages of the subject of the invention are found in the following description of the drawing, which shows a preferred embodiment with the necessary details and components. In the drawing:

DETAILED DESCRIPTION OF THE PREFERRED EMBODIMENTS

Figure 1:
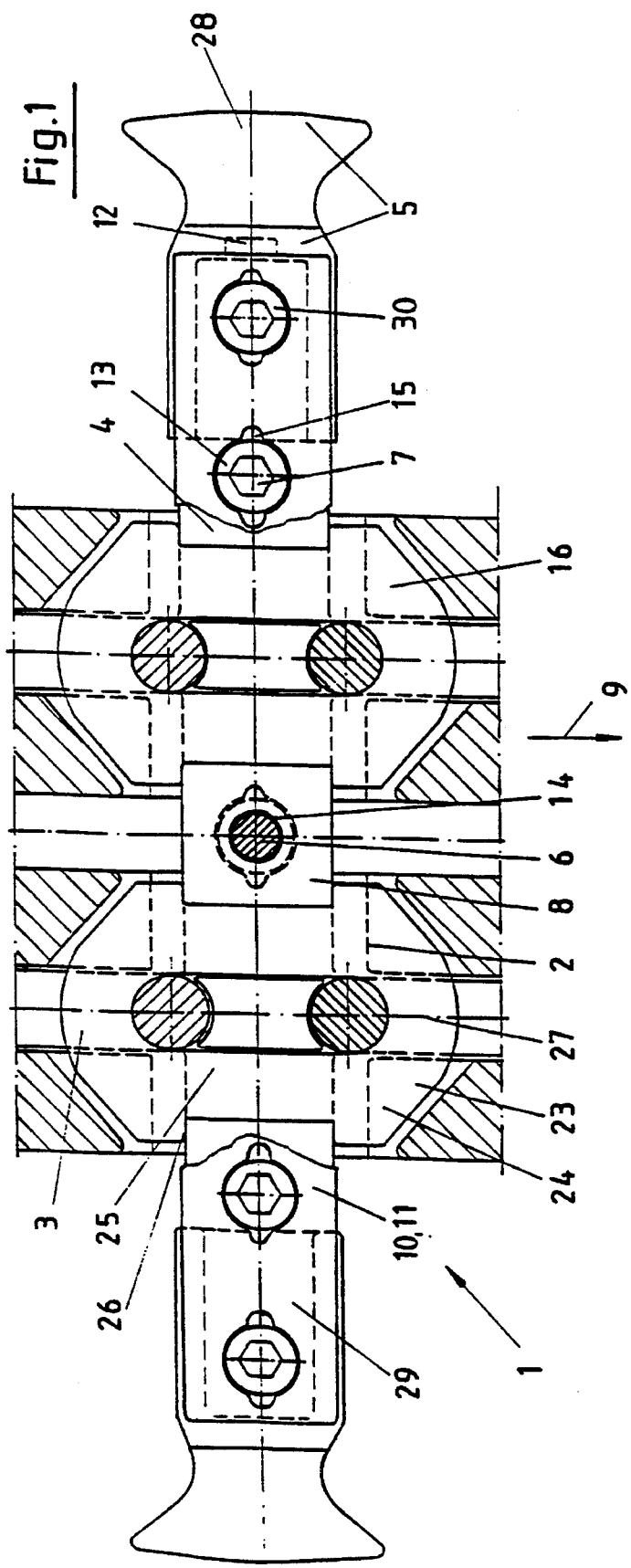
FIG. 1 shows a top view onto a chain belt constructed as a double chain center belt.

FIG. 1 shows a partial area of a chain belt 1, i.e., the area of a pusher 4. This pusher 4 is connected via horizontal links 2, which are arranged between vertical links 3, to the chain belt, so that they can run in the conveyor trough not shown here. The drawing according to FIG. 1 suggests a starwheel which transmits the drive force onto the chain belt 1 as the chain links 2, 3 pass over it.

On the sides, the individual pushers 4 are guided over the guide shoes 5, which for this purpose are guided inside suitably shaped trough profiles.

The individual pushers 4 are clamped together via retaining screws 6, 7, in order to be able to clamp the individual horizontal links 2 between them. To facilitate this, the design of the pusher 4 shown in FIG. 1 and particularly in FIG. 2 has a base 8 divided into two parts.

Figure 2:
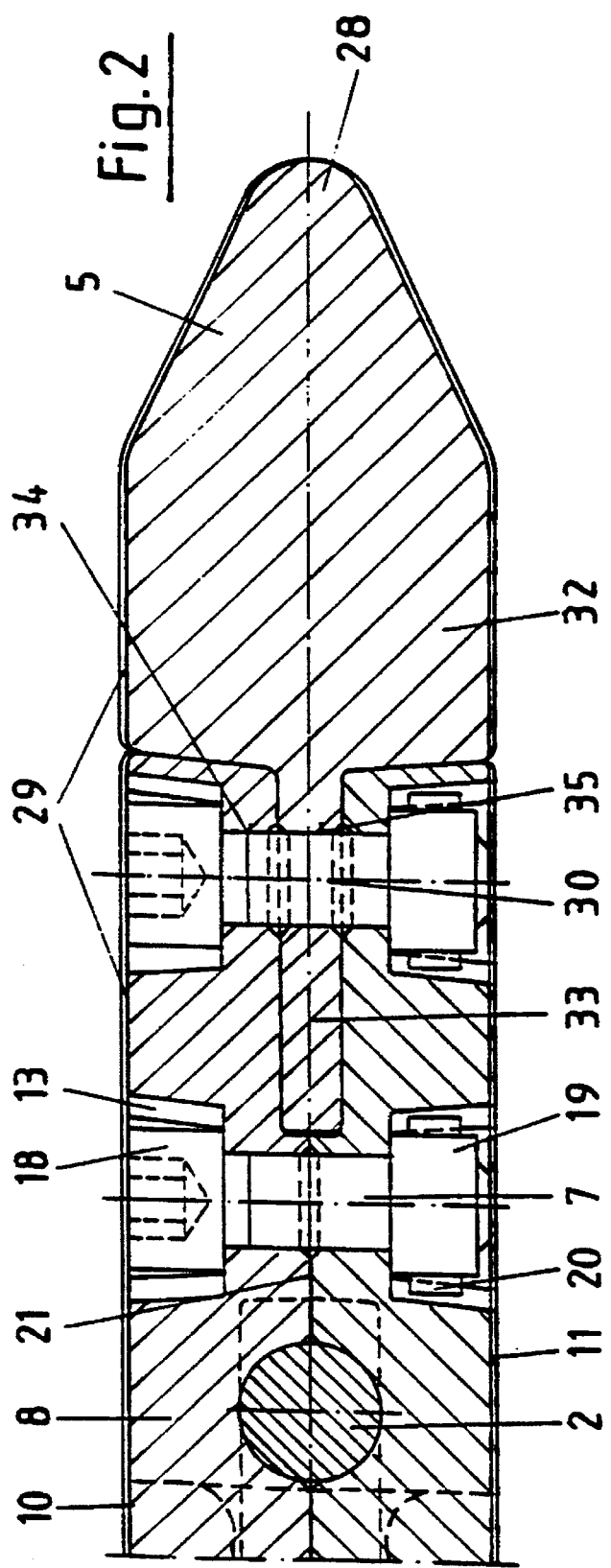
FIG. 2 shows a longitudinal section through a pusher according to FIG. 1.

FIG. 2 shows, as mentioned, the longitudinal section through such a pusher 4, whereby it is clearly shown that the latter is divided in the conveying direction 9, i.e., exactly in the center, resulting in an identical top part 10 and bottom part 11. These two parts 10, 11 are connected to the guide shoe 5, as will be explained below, whereby this connection can be safely released after longer operating times, since an articulated groove 12 is provided in the area of the dividing line, as shown in FIG. 1, right.

The retaining screws 6, 7 are accommodated in a protected manner in the top parts 10 or bottom parts 11, for which purpose blind holes 13, 14 have been constructed there. These blind holes 13, 14 are equipped with lateral recesses 15 to enable the fixation of the retaining noses 20 assigned to the respective bottom screw head 19. This makes it possible to work with the respective top screw head 18 without risking that the retaining screw 6, 7 turns also.

The drawing according to FIG. 1 shows a double chain center conveyor in which two horizontal links 2, 16 each connect the actual chain belt 1 to the pushers 4.

FIG. 2 shows the dividing joint 21 that separates top part and bottom part 10, 11 from each other. On the outside, the pusher is equipped with a corresponding recess, into which a correspondingly projecting part of the guide shoe 5 can be inserted, a fact explained in more detail below.

The top view according to FIG. 2, as already mentioned, shows two horizontal links 2, 16, whereby these chain links 2, 16 have a special shape. The arches 23 have horizontally and vertically extending double helical surfaces 24 and straight sides 25 that recede correspondingly. This creates projections 26 of the arches 23, which encompass and guide the pushers 4 correspondingly. This ensures an optimal tight seat or connection.

The arches 23 have a center tip 27, i.e., they are constructed identical to the vertical links 3 in regard to this center tip 27.

The guide shoe 5 consists of the guide part that tapers off into a rounded tip 28, a glider 32, and the clamping part 23 projecting between top part 10 and bottom part 11. The glider 32 has the same running surface 29 as the base 8, whereby both are connected with each other via a retaining screw 30.

To connect base 5 and guide shoe, the top part 10 and bottom part 11 have a bore 34, and the clamping part 33 has a correspondingly placed retaining bore 35. The retaining screw 30 to be inserted here is identical to retaining screws 6 and 7 used to connect top part 10 and bottom part 11.

Figure 3:
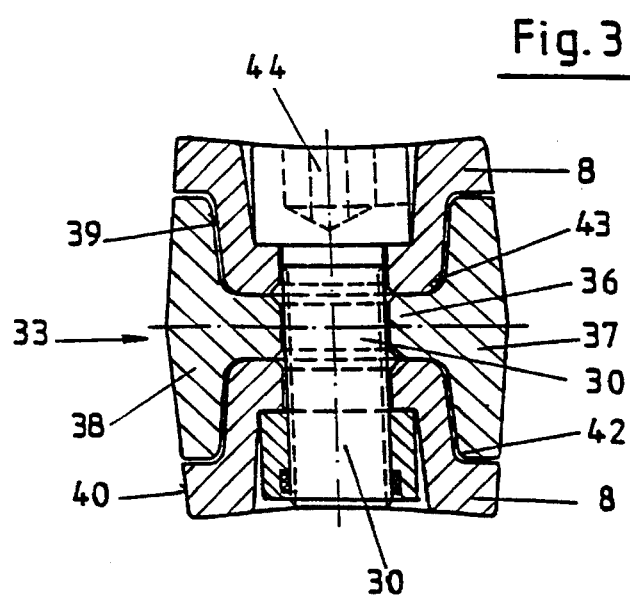
FIG. 3 shows a cross-section through a pusher near the connection of guide shoe and base.

FIG. 3 clarifies the special design of the clamping piece 33 which is constructed in double T-shape. The center bar 36 holds the retaining bore 35, while the side bars 37, 38 are located inside a recess 39 of the sides 40. This ensures an optimum safe connection between guide shoe 5 and base 8 in all directions.

The edges 42, 43 provided at the contact surfaces each are rounded so that the guide shoe 5 is easily inserted into or connected to the base 8. The cross-section shown in FIG. 3 is provided exactly in the area of the retaining screw 30. The drawing according to FIG. 3 shows that here retaining screws 30, as well as 6 and 7, are used, which have a hexagon socket 44, so that the screwing of these parts is much facilitated, and, in particular, the blind holes 13, 14 provided need only have dimensions adapted to the screw heads 18, 19.

Figure 4:
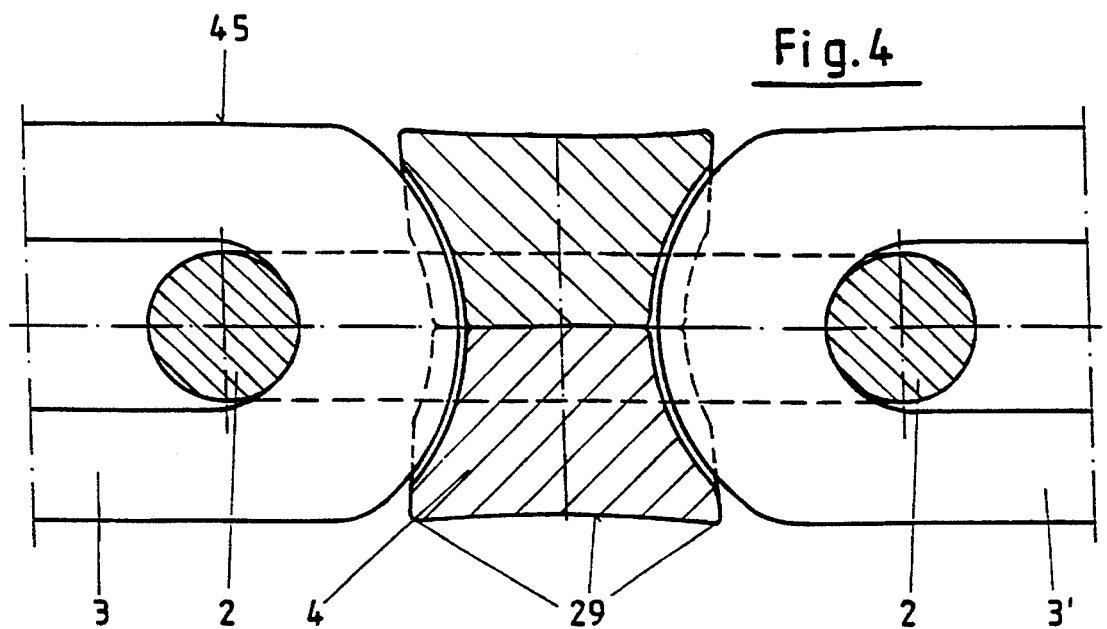
FIG. 4 shows a section through a pusher in the area of the center part, i.e., in the area of the vertical chain links.

FIG. 4 shows a section in the area of the pusher 4, clarifying the arrangement of the horizontal links 2 or vertical links 3, 3' which have running surfaces 45 identical to running surface 29. This ensures a favorable guidance of the chain belt 1 on the trough profile.

All mentioned characteristics, including those only deduced from the drawings, are held as essential to the invention, either alone or in combination with each other.

We claim:

1. Chain belt for chain conveyors used in underground mining and tunnel construction, having vertical and horizontal links and pushers spaced apart and encompassing the horizontal links, said pushers being equipped at the end with guide shoes adapted to the guide profile of the troughs, characterized in
that the guide shoes (5) are connected releasably to the base (8) of the pusher (4); that the guide shoes (5) are symmetrical when viewed transversely to the conveying direction (9); and that the base (9) is divided lengthwise in the center and has identically constructed top (10) and bottom (11) parts.

2. Chain belt as claimed in claim 1, characterized in
that the base (8) is constructed so as to be positioned transversely to the conveying direction (9) and so as to accept two adjoining horizontal chain links (2, 16), whereby the chain links are arranged so as to be encompassed between top and bottom part (10, 11).

3. Chain belt as claimed in claim 1, characterized in
that the symmetric guide shoes (5) consist of a rounded tip (28) engaging with the guide profile of the troughs, a short glider (32), and a clamping piece (32) that can be inserted between top (10) and bottom (11) part and having a retaining bore (35) corresponding to the bores (34) in the top and bottom part.

4. Chain belt as claimed in claim 1, characterized in
that the clamping piece (33) is constructed in a double T-shape, whereby the center bar (36) holds the retaining bore (35), and the side bars (37, 38) are constructed so as to mesh with correspondingly formed recesses (39) in the sides (40) of the base (8), and whereby the clamping piece (33) and base (8) have rounded edges (42, 43) at the contact surfaces.

5. Chain belt as claimed in claim 1, characterized in
that the retaining screws (6,7) that connect the top (10) and bottom (11) part of the base (8) and are positioned in blind holes (18, 19) are constructed identical to the retaining screws (30) connecting the bases and guide shoes (50) or clamping piece (33).

6. Chain belt as claimed in claim 5, characterized in
that the blind holes (13,14) have on both sides projecting recesses (15) that are constructed so as to accept retaining noses (20) coordinated with one of the screw heads (19) of the retaining screws (6, 7, 30).

7. Chain belt as claimed in claim 5, characterized in
that the guide shoes (5) are equipped with an articulated groove (12) near the dividing joint (21) towards the base (8).

8. Chain belt as claimed in claim 1, characterized in
that the horizontal links (2,16) encompassed by the base (8) have arches (23) with horizontally and vertically acting double helical surfaces (24) and are designed in a recessed manner, with straight sides (25) that encompass the pusher (4).

9. Chain belt as claimed in claim 8, characterized in
that the double helical surfaces (24) have sides forming a kinematically rising and rounded central tip (27) of 120° to 140°.

10. Chain belt as claimed in claim 8, characterized in
that the double helical surfaces (24) are laterally swaged to the arches (23), or the horizontal links (2, 16) are swaged in their entirety.

11. Chain belt as claimed in claim 8, characterized in
that the vertical links (3) have a flattened side that results in a larger contact surface (45).

12. Chain belt as claimed in claim 1, characterized in
that the running surface (29) of the pusher (4), preferably of the base (8), has a concave shape when viewed as a cross-section.

* * * * *